United States Patent
Foley et al.

(10) Patent No.: US 11,299,932 B2
(45) Date of Patent: Apr. 12, 2022

(54) RAIL ASSEMBLIES FOR MOTORIZED ARCHITECTURAL COVERINGS AND RELATED METHODS

(71) Applicant: Hunter Douglas, Inc., Pearl River, NY (US)

(72) Inventors: Patrick Foley, Evergreen, CO (US); Clark D. Brace, Westminster, CO (US); Paul A. Brayford, Denver, CO (US); Charles Culver Gidden Cooper, Arvada, CO (US); Daniel A. Huber, Arvada, CO (US); Douglas J. Lorenz, Louisville, CO (US); Paul D. Mischo, Broomfield, CO (US); Todd M. Nelson, Louisville, CO (US); Mark Schwandt, Thornton, CO (US); Jeffrey L. Spray, Erie, CO (US)

(73) Assignee: Hunter Douglas, Inc., Pearl River, NY (US)

( * ) Notice: Subject to any disclaimer, the term of this patent is extended or adjusted under 35 U.S.C. 154(b) by 280 days.

(21) Appl. No.: 16/154,183

(22) Filed: Oct. 8, 2018

(65) Prior Publication Data
US 2019/0106938 A1 Apr. 11, 2019

Related U.S. Application Data

(60) Provisional application No. 62/569,792, filed on Oct. 9, 2017.

(51) Int. Cl.
*E06B 9/42* (2006.01)
*E06B 9/72* (2006.01)
(Continued)

(52) U.S. Cl.
CPC ............ *E06B 9/72* (2013.01); *E04F 10/0685* (2013.01); *E06B 9/42* (2013.01); *E06B 9/50* (2013.01);
(Continued)

(58) Field of Classification Search
CPC ..... E06B 9/72; E06B 9/38; E06B 9/42; E06B 9/50; E06B 9/323; E06B 9/17;
(Continued)

(56) References Cited

U.S. PATENT DOCUMENTS 1,379,663 A 5/1921 Tomasulo
3,928,897 A * 12/1975 Tombu .................... B44C 7/022
24/462

(Continued)

FOREIGN PATENT DOCUMENTS

DE 19716890 A1 † 11/1998
EP 3056649 8/2016
(Continued)

OTHER PUBLICATIONS

European Patent Office, "Extended European Search Report," issued in connection with European Application No. 18198934.4, dated Jun. 26, 2019, 10 pages.
(Continued)

*Primary Examiner* — Johnnie A. Shablack
*Assistant Examiner* — Jeremy C Ramsey
(74) *Attorney, Agent, or Firm* — Kilpatrick Townsend & Stockton LLP

(57) ABSTRACT

Examples of rail assemblies for architectural coverings disclosed herein stabilize motor assemblies via end caps to reduce transfers of vibrational motor forces to the rails. An example rail for an architectural covering includes a housing, a motor to be disposed in the housing, and an end cap to be coupled to said housing. The example rail includes a
(Continued)

track defined in an exterior face of the rail. A first portion of the end cap is to be received in the track. The end cap is capable of at least two degrees of freedom of motion relative to the housing prior to the first portion being received in the track. In the example rail, the track is to restrict the at least two degrees of freedom of motion of the end cap when the first portion of the end cap is received in the track.

20 Claims, 9 Drawing Sheets

(51) Int. Cl.
    *E06B 9/58*     (2006.01)
    *E04F 10/06*     (2006.01)
    *E06B 9/50*     (2006.01)
    *H02P 25/04*     (2006.01)

(52) U.S. Cl.
    CPC .......... *E06B 9/581* (2013.01); *E04F 10/0614* (2013.01); *E06B 2009/587* (2013.01); *H02K 2207/03* (2013.01); *H02P 25/04* (2013.01)

(58) Field of Classification Search
    CPC ............. E06B 9/17007; E06B 9/17015; E06B 9/17023; E06B 9/581
    See application file for complete search history.

(56) References Cited

U.S. PATENT DOCUMENTS

| | | | | |
|---|---|---|---|---|
| 4,750,539 | A * | 6/1988 | Chang | E06B 9/323 160/176.1 V |
| 5,927,366 | A * | 7/1999 | Bryant | E06B 9/388 160/173 R |
| 6,446,693 | B1 * | 9/2002 | Anderson | E06B 9/32 160/168.1 P |
| 6,457,688 | B1 | 10/2002 | Welfonder | |
| 6,497,267 | B1 | 12/2002 | Azar et al. | |
| 7,057,360 | B1 * | 6/2006 | Hsu | E06B 9/72 318/105 |
| 7,281,561 | B2 | 10/2007 | Anderson et al. | |
| 7,360,573 | B2 * | 4/2008 | Yu | E06B 9/38 160/178.1 R |
| 7,380,582 | B1 | 6/2008 | Anderson et al. | |
| 7,659,645 | B2 | 2/2010 | Bi | |
| 7,723,939 | B2 | 5/2010 | Carmen, Jr. | |
| 7,726,379 | B2 * | 6/2010 | Beau | E06B 9/72 160/310 |
| 7,737,583 | B2 | 6/2010 | Bi | |
| 7,779,887 | B2 | 8/2010 | Hammond et al. | |
| 8,009,433 | B2 * | 8/2011 | Ares | H01Q 1/007 361/752 |
| 8,141,614 | B2 | 3/2012 | Friedrick et al. | |
| 8,193,742 | B2 | 6/2012 | Skinner et al. | |
| 8,297,819 | B2 | 10/2012 | Pfund et al. | |
| 8,299,734 | B2 | 10/2012 | Mullet et al. | |
| 8,307,878 | B2 | 11/2012 | Faller et al. | |
| 8,602,176 | B2 | 12/2013 | Khuu | |
| 8,723,454 | B2 | 5/2014 | Skinner et al. | |
| 8,807,190 | B2 | 8/2014 | Wills et al. | |
| 8,960,260 | B2 | 2/2015 | Anderson et al. | |
| 9,091,118 | B2 | 7/2015 | Anderson et al. | |
| 9,115,538 | B2 * | 8/2015 | Andreasen | H02K 11/21 |
| 9,133,662 | B2 * | 9/2015 | Nocito | E04F 10/0685 |
| 9,194,179 | B2 | 11/2015 | Mullet et al. | |
| 9,587,431 | B2 * | 3/2017 | Choo | E06B 9/72 |
| 9,657,516 | B2 * | 5/2017 | Graybar | E06B 9/322 |
| 9,759,008 | B2 * | 9/2017 | Anderson | E06B 9/322 |
| 9,797,188 | B2 * | 10/2017 | Rettig | E06B 9/262 |
| 9,926,741 | B2 * | 3/2018 | Faller | E06B 9/72 |
| 10,036,200 | B2 * | 7/2018 | Anderson | A47H 3/10 |
| 10,202,802 | B2 * | 2/2019 | Colson | E06B 9/78 |
| 10,519,713 | B2 * | 12/2019 | Holt | E06B 9/50 |
| 10,584,528 | B2 * | 3/2020 | Anderson | E06B 9/388 |
| 10,704,324 | B2 * | 7/2020 | Goldberg | E06B 9/323 |
| 10,731,411 | B2 * | 8/2020 | Holt | E06B 9/42 |
| 10,934,773 | B2 * | 3/2021 | Lemaitre | E06B 9/72 |
| 2004/0129849 | A1 * | 7/2004 | Walker | E06B 9/72 248/266 |
| 2006/0086874 | A1 | 4/2006 | Habel et al. | |
| 2008/0121353 | A1 * | 5/2008 | Detmer | E06B 9/72 160/266 |
| 2009/0000749 | A1 | 1/2009 | Amann et al. | |
| 2009/0242145 | A1 * | 10/2009 | Sheu | E06B 9/322 160/311 |
| 2010/0175838 | A1 * | 7/2010 | Faller | H02K 5/24 160/310 |
| 2010/0326605 | A1 | 12/2010 | Guillen Chico | |
| 2011/0139380 | A1 | 6/2011 | Anthony et al. | |
| 2011/0253320 | A1 † | 10/2011 | Baugh | |
| 2011/0265958 | A1 * | 11/2011 | Skinner | E06B 9/322 160/127 |
| 2013/0199735 | A1 | 8/2013 | Colson et al. | |
| 2013/0269887 | A1 * | 10/2013 | Skinner | E06B 9/72 160/331 |
| 2014/0224437 | A1 | 8/2014 | Colson et al. | |
| 2014/0290870 | A1 | 10/2014 | Colson et al. | |
| 2015/0144276 | A1 | 5/2015 | Lee | |
| 2015/0176331 | A1 | 6/2015 | Chen | |
| 2015/0376941 | A1 | 12/2015 | Fujita et al. | |
| 2016/0017656 | A1 | 1/2016 | Adreon | |
| 2016/0047163 | A1 | 2/2016 | Blair et al. | |
| 2016/0201389 | A1 † | 7/2016 | Oakley | |
| 2016/0230460 | A1 | 8/2016 | Colson et al. | |
| 2016/0237743 | A1 | 8/2016 | Holt et al. | |
| 2016/0258209 | A1 | 9/2016 | Berman et al. | |
| 2017/0006740 | A1 * | 1/2017 | Holt | E06B 9/72 |
| 2017/0081916 | A1 * | 3/2017 | Greening | E06B 9/42 |
| 2017/0234066 | A1 | 8/2017 | Graybar | |
| 2017/0241201 | A1 † | 8/2017 | Buccola, Jr. | |
| 2017/0268292 | A1 | 9/2017 | Holt et al. | |
| 2018/0002981 | A1 | 1/2018 | Colson et al. | |
| 2018/0038162 | A1 | 2/2018 | Colson et al. | |
| 2018/0106105 | A1 * | 4/2018 | Anthony | H01H 19/46 |
| 2018/0106107 | A1 | 4/2018 | Smith et al. | |
| 2018/0155984 | A1 | 6/2018 | Jay | |
| 2018/0202228 | A1 * | 7/2018 | Faller | H02K 5/24 |
| 2019/0040681 | A1 * | 2/2019 | Kirby | E06B 9/72 |
| 2019/0085631 | A1 * | 3/2019 | Reinecker | H02K 5/24 |
| 2019/0106938 | A1 * | 4/2019 | Foley | E06B 9/50 |
| 2019/0162022 | A1 * | 5/2019 | Geiger | E06B 9/68 |
| 2019/0234143 | A1 | 8/2019 | Colson et al. | |
| 2019/0284876 | A1 | 9/2019 | Colson et al. | |
| 2020/0165866 | A1 * | 5/2020 | Holt | E06B 9/72 |
| 2020/0185965 | A1 * | 6/2020 | Poirier | H02J 50/27 |
| 2020/0263494 | A1 * | 8/2020 | Hebeisen | E06B 9/72 |

FOREIGN PATENT DOCUMENTS

| | | |
|---|---|---|
| EP | 3309347 | 4/2018 |
| JP | H06-59597 U † | 8/1994 |
| WO | 2011000908 | 1/2011 |
| WO | 2011150412 | 12/2011 |
| WO | 2013052083 | 4/2013 |
| WO | 2016131081 | 8/2016 |

OTHER PUBLICATIONS

European Patent Office, "Search Report," issued in connection with European Patent Application No. 19179513.7 dated Dec. 6, 2019, 11 pages.

\* cited by examiner
† cited by third party

RAIL ASSEMBLIES FOR MOTORIZED ARCHITECTURAL COVERINGS AND RELATED METHODS

RELATED APPLICATION

This patent claims the benefit of U.S. Provisional Patent Application Ser. No. 62/569,792, filed on Oct. 9, 2017, under 35 U.S.C. § 119(e). U.S. Provisional Patent Application Ser. No. 62/569,792 is hereby incorporated by reference in its entirety.

FIELD OF THE DISCLOSURE

This disclosure relates generally to architectural coverings, and, more particularly, to rail assemblies for motorized architectural coverings and related methods.

BACKGROUND

Some architectural coverings include a motor assembly to control, for example, extension or retraction of fabric or other shading material via a rotating member (e.g., a roller tube or lift rod). Some architectural coverings include a head rail having end caps for housing the motor assembly between the end caps. In some architectural coverings, vibrations and/or torsional motion generated by a motor of the motor assembly during operation are translated to one or more other components of the motor assembly, such as a printed circuit board. Some architectural coverings include two or more printed circuit boards disposed in the head rail. For example, a first printed circuit board can include a motor controller to control the motor and a second printed circuit board can include a controller, such as a radio frequency controller that responds to user inputs to control operation of the covering (such as via an antenna in communication with a remote control). Some such architectural coverings include two or more printed circuit boards to reduce the effects of motor vibrations on electrical hardware disposed in the architectural covering.

BRIEF DESCRIPTION OF THE DRAWINGS

Implementations of rail assemblies for architectural coverings constructed in accordance with various principles disclosed herein will be described with respect to the following drawings, which are not to be considered as limiting, but rather, illustrations of examples of manners of implementing principles of the disclosure. Many other implementations will occur to persons of ordinary skill in the art upon reading this disclosure

Figure 1:
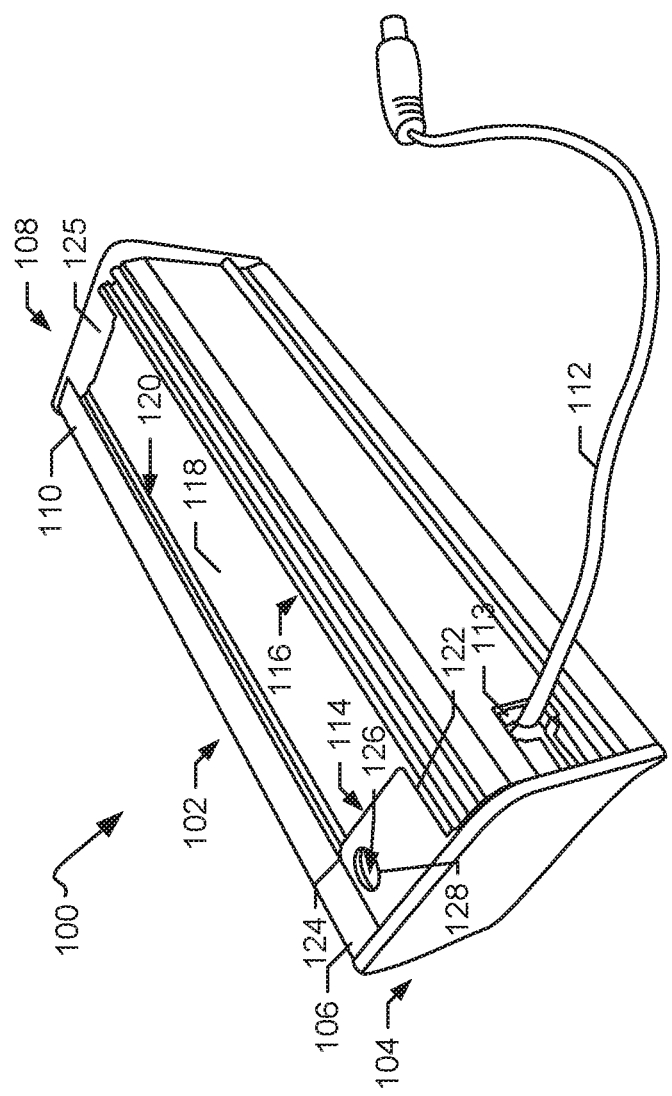
FIG. 1 is a right, rear perspective view of an example of a rail assembly in accordance with the teachings of this disclosure.

The figures are not necessarily to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Disclosed herein are examples of rail assemblies for architectural coverings. Disclosed examples include a motor assembly disposed in a rail, which can be a head rail, to control, for example, extension or retraction of shading material of the architectural covering. In disclosed examples, the motor assembly includes a printed circuit board including a motor controller to control a motor. In disclosed examples, the printed circuit board includes one or more other controllers, such as an antenna switch. Thus, some disclosed examples provide for a single printed circuit board to be disposed in the rail and do not require separate printed circuit boards, where one printed circuit board includes hardware for controlling the motor and the other printed circuit board includes hardware communicating with, for example, an antenna. Some disclosed examples include two or more printed circuit boards.

To maintain the integrity of the printed circuit board with respect to, for example, a position of the printed circuit board and/or one or more components thereof during operation of the motor, in some disclosed examples, rail assemblies include means for securely positioning the motor assembly relative to the rail. Some disclosed examples include end caps having one or more protrusions, receivers, holders, etc. that locate or orient one or more components of the motor assembly. In some disclosed examples, end caps are coupled to a housing of the motor assembly to securely position the motor assembly relative to the rail when the motor assembly is disposed in the rail by, for example, preventing sliding of the motor assembly within the rail. Some example end caps disclosed herein include a printed circuit board holder to receive a portion of the printed circuit board of the motor assembly to prevent rotation of the printed circuit board during operation of the motor.

In examples disclosed herein, when the end cap is coupled to the motor assembly, the end cap can move with at least one degree of freedom of motion and, in some examples, at least two degrees of freedom of motion or at least three degrees of freedom of motion relative to the motor assembly before the end cap is coupled to the rail. For example, the end cap can pivot relative to the motor assembly. In examples disclosed herein, the freedom of motion of the end cap relative to the motor assembly accommodates extrusion tolerance of the rail, promotes ease of assembly of the rail assembly, reduces noise during operation of the motor, etc.

In examples disclosed herein, the motor assembly is slidably received in the rail. In some disclosed examples, a shape of the housing of the motor assembly complements a shape of the rail to provide for a slide fit between the motor assembly and the rail that substantially reduces unrestrained movement of the motor assembly, such as rocking of the motor assembly. In some disclosed examples, a shape of the housing of the motor assembly can be selectively adjusted based on the shape of the rail to enable a secure slide fit to be achieved between the motor assembly and differently shaped rails. In examples disclosed herein, the rail stabilizes the end cap(s) and, thus, the motor assembly relative to the rail to effectively reduce vibrational effects of the motor on the rail assembly.

All apparatuses and methods discussed in this document are examples of apparatuses and/or methods implemented in accordance with one or more principles of this disclosure. These examples are not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Further, the names given to the specific elements, structures, or features should not be understood as the only names for the specific elements. Other examples of manners of implementing the disclosed principles will occur to a person of ordinary skill in the art upon reading this disclosure.

Turning now to the figures, FIG. 1 is a right, rear perspective view of an example of rail assembly 100 including rail 102, first end cap 104 removably coupled to first end 106 of rail 102, and second end cap 108 removably coupled to second end 110 of rail 102. The rail assembly 100 can be a head rail for a motorized architectural covering. As disclosed herein, motor assembly 200 (FIG. 2) is disposed in rail 102. Motor assembly 200 is coupled to a power source (e.g., an electrical outlet) via cable 112 (e.g., an electrical wire, a power cord, etc., hereinafter generally referred to as a "cable") that is coupled to and extends from motor assembly 200. In some examples, first end cap 104 includes cable receiver 113 to receive at least a portion of cable 112 to facilitate routing of cable 112 from the motor assembly to the power source, to provide strain relief when a user pulls on cable 112 to protect motor assembly 200 from undue strain, etc. Cable receiver 113 also reduces direct contact between cable 112 and edges of rail 102, which reduces wear on cable 112. First end cap 104 can have a different size and/or shape than illustrated in FIG. 1.

In accordance with one aspect of this disclosure, at least a portion of the motor assembly is removably coupled to the end cap. Also, in accordance with the present disclosure, the end cap(s) may be removably coupled to the rail. Therefore, the end cap, the motor assembly, and the rail form substantially one unit when the end cap(s) are coupled to the rail. When the end cap(s) are coupled to the rail, the rail restricts movement of the end cap(s) relative to the rail. As a result, movement of the motor assembly relative to the end cap(s) and the rail is also reduced due to the coupling of the motor assembly to the end cap. Thus, the coupling of the end cap(s) to the rail reduces relative movement between the rail, the end cap(s) and the motor assembly. Therefore, undesirable motion between the parts (e.g., due to vibrations of the motor) is substantially reduced when the end cap(s) are coupled to the rail as compared to if, for example, the motor assembly was not coupled to the rail. Therefore, the end cap(s) of the present disclosure do not simply act as a cover that merely forms a housing for the motor assembly with the rail. Rather, the end cap(s) of the present disclosure facilitate stability of the motor assembly and, thus, help to reduce the transfer of motor vibrations to the rail as compared to if the motor assembly was not coupled to the end cap(s).

For example, as illustrated in FIG. 1, first end cap 104 includes first protrusion 114. Also, rail 102 of FIG. 1 includes first track 116 (e.g., a slot) defined in a face 118 of rail 102 and second track 120 (e.g., a slot) defined in face 118 opposite first track 116. In the example of FIG. 1, respective edges 122, 124 of first protrusion 114 of first end cap 104 are at least partially received in tracks 116, 120 of rail 102 to align first end cap 104 relative to rail 102 such that when edges 122, 124 of first protrusion 114 are received in tracks 116, 120 of rail 102, first end cap 104 is coupled to rail 102. First end cap 104 can include other protrusions that engage one or more other portions of rail 102 to couple first end cap 104 to rail 102. In some examples, first protrusion 114 includes an opening 126 defined therein to receive a pin 128. Pin 128 can serve to further restrain movement of first end cap 104 relative to rail 102 by, for example, preventing sliding of edges 122, 124 of first protrusion 114 relative to tracks 116, 120.

When edges 122, 124 of first protrusion 114 are received in tracks 116, 120 of rail 102, movement of first end cap 104 relative to one or more axes extending through rail 102, such as a pitch axis and/or a roll axis, is restricted. Further, as discussed above, motor assembly 200 is coupled to first end cap 104 and, thus, movement between rail 102 and motor assembly 200 is reduced when first end cap 104 is coupled to rail 102. The coupling of first end cap 104 to rail 102 stabilizes first end cap 104, motor assembly 200, and rail 102 relative to one another and, thus, reduces relative movement between first end cap 104, motor assembly 200, and rail 102. Therefore, undesirable motion between first end cap 104, motor assembly 200, and rail 102 due to, for example, motor vibrations is substantially minimized.

Similarly, second end cap 108 includes first protrusion 125 having edges that are at least partially received in first and second tracks 116, 120 of rail 102 to couple second end cap 108 to rail 102. Second end cap 108 can include other protrusions to engage one or more other portions of rail 102 to couple second end cap 108 to rail 102. Rail 102 can include other means for coupling end cap(s) 104, 108 to rail 102 than tracks 116, 120, such as hooks, clamps, etc. Also, although in the example of FIG. 1, tracks 116, 120 are formed in exterior face 118, in other examples the tracks 116, 120 or other means for coupling end cap(s) 104, 108 to rail 102 may be formed in an interior of the rail 102.

In accordance with one aspect of this disclosure, the motor assembly is slidably disposed in the rail. For example, prior to the end cap(s) being coupled to the rail, a user such as a manufacturer or installer of the architectural covering including the rail assembly can insert the motor assembly into the rail. In accordance with one aspect of the disclosure, the motor assembly includes a housing having a shape that complements a shape of the rail to provide for a substantially secure slide fit between the rail and the motor assembly.

Figure 2:
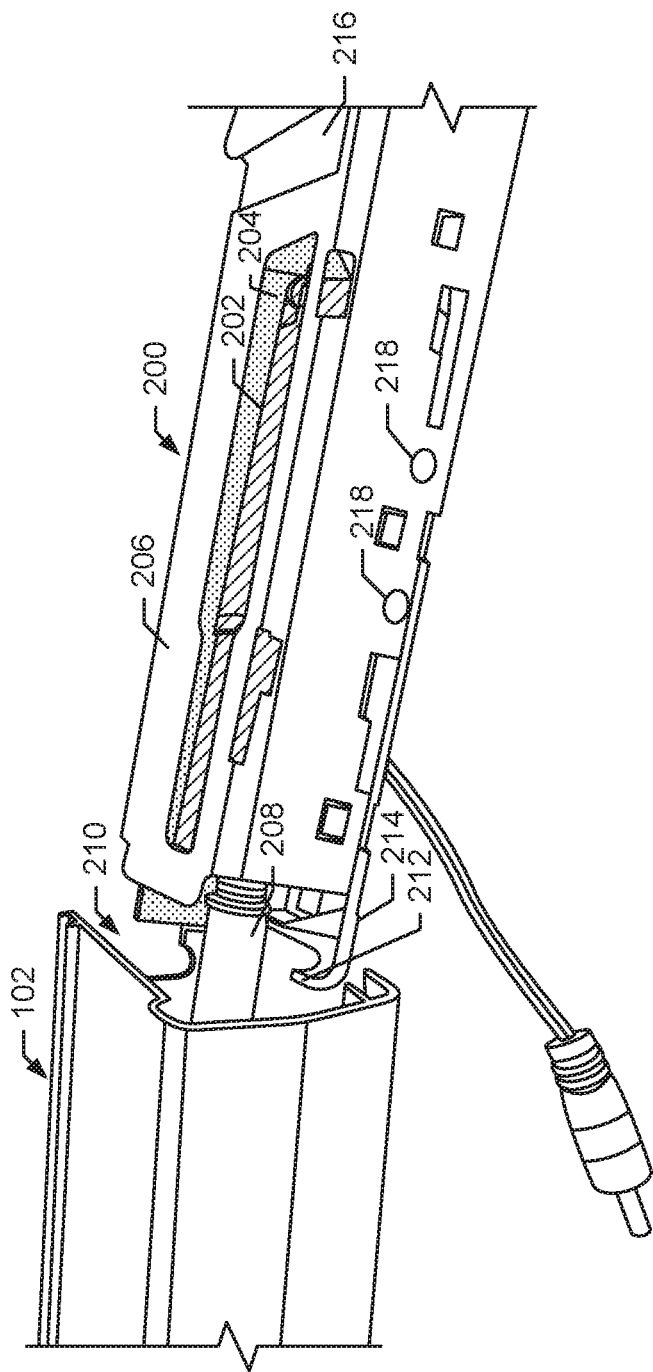
FIG. 2 is a side, front perspective view of the example of the rail assembly of FIG. 1, showing a motor assembly removed from an interior of a rail of the rail assembly.

FIG. 2 is a side, front perspective view of rail assembly 100, showing motor assembly 200 removed from rail 102. Motor assembly 200 includes motor 202 and printed circuit board 204 including hardware to control motor 202. In the example of FIG. 2, motor assembly 200 is disposed in motor assembly housing 206. Shaft 208 of motor 202 can be coupled to, for example, rotating member (e.g., a roller tube or lift rod (not shown)) to cause extension and retraction of a shading material (e.g., fabric) via motor 202. As shown in FIG. 2, a shape of motor assembly housing 206 complements a shape of rail 102 such that motor assembly housing 206 can be slidably disposed in interior 210 of rail 102. Put another way, a fit between interior 210 of rail 102 and motor assembly housing 206 can be a slip fit. For example, motor assembly housing 206 can have a substantially rectangular exterior shape that complements a substantially rectangular interior shape of rail 102. The complementary shapes of motor assembly housing 206 and rail 102 prevents or substantially reduces rotation or vibration of motor assembly 200 relative to rail 102 due to vibrations of motor 202, as compared to if there was a large degree of clearance between motor assembly housing 206 and interior 210 of rail 102. Put another way, in the example of FIG. 2, rail 102 substantially constrains excessive movement of the motor assembly 200.

In one aspect of the disclosure, the motor assembly housing includes guides to direct a user as to the direction in which to insert motor assembly into the rail. In some disclosed examples, the guides include protrusions or sleds. In some disclosed examples, the guides serve to further couple of the motor assembly to the rail by engaging one or more portions of the rail.

For example, motor assembly housing 206 of FIG. 2 includes means for coupling motor assembly housing 206 to rail 102. The means for coupling provides for engagement between one or more portions of motor assembly housing 206 and one or more portions of rail 102, such as an interior of rail 102, to couple motor assembly housing 206 to rail 102. The means for coupling motor assembly housing 206 to rail 102 can be associated with (e.g., disposed on, coupled to) motor assembly housing 206 and/or rail 102. The means for coupling motor assembly housing 206 to rail 102 can include, for example, one or more tabs, protrusions, hooks, latches, etc. For example, the means for coupling can include tabs or protrusions coupled to motor assembly housing 206. The tabs or protrusion engage one or more portions of interior 210 of rail 102 and, in some examples, engage corresponding openings or receivers of rail 102. The tabs or protrusions can be integrally formed with motor assembly housing 206 (e.g., via a mold) or separately formed from motor assembly housing 206 and coupled to motor assembly housing 206 via one or more mechanical and/or chemical fasteners.

For example, motor assembly housing 206 includes a sled or protrusion 212 formed at first end 214 of motor assembly housing 206. Sled 212 can engage a complementary protrusion or opening defined in interior 210 of rail 102 to couple motor assembly housing 206 to rail 102. Sled or protrusion 212 can have other shapes, sizes, etc. than those illustrated in FIG. 2. Also, motor assembly housing 206 can include additional sleds 212 than illustrated in FIG. 2. Thus, the means for coupling motor assembly housing 206 to rail 102 (e.g., sled 212) provides for substantially secure engagement between motor assembly housing 206 and rail 102.

In the example of FIG. 2, sled 212 (or other means for coupling motor assembly housing 206 to rail 102) can serve as a guide for a user with respect to a direction in which motor assembly housing 206 should be inserted into interior 210 of rail 102 to facilitate proper mounting of motor assembly 200 relative to rail 102. For example, first end 214 of motor assembly housing 206 can include sled 212, however, a second end 216 of motor assembly housing 206 may not include a sled. In operation, second end 216 of motor assembly housing 206 may couple to first end cap 104 as shown, for example, in FIG. 1. Thus, in examples where first end 214 of motor assembly housing 206 includes sled 212 but second end 216 does not include a sled, motor assembly housing 206 will not properly couple to rail 102 if the user inserts motor assembly housing 206 into interior 210 of rail 102 with second end 216 as a leading into interior 210 of rail 102 rather than first end 214. Thus, sled(s) 212 facilitate proper assembly of motor assembly 200 relative to rail 102.

In the example of FIG. 2, a size of motor assembly housing 206 relative to a size of interior 210 of rail 102 provides for a degree of clearance to enable motor assembly housing 206 to slide relative to rail 102, but, as disclosed above, not such a large degree of clearance to allow substantially unrestrained motion of motor assembly 200. In some examples, motor assembly housing 206 includes one or more housing vibration dampers 218 coupled to motor assembly housing 206. Housing vibration damper(s) 218 reduce or dampen vibrations of motor assembly housing 206 and, in some examples, rail 102 during operation of motor 202. Housing vibration damper(s) 218 can include one or more materials to absorb vibrations from motor 202 and, thus, reduce or prevent vibration of motor assembly housing 206 against rail 102. Housing vibration damper(s) 218 can include, for example, one or more pads made of foam (e.g., poron) or other filing material(s) that dampen vibration forces. In some examples, housing vibration damper(s) 218 are formed from substantially the same material as motor assembly housing 206, such as a metal or plastic. In such examples, housing vibration damper(s) 218 can include one or more design features to reduce the transfer of vibrations from motor 202 to rail 102. For example, housing vibration damper(s) 218 can include relief cut(s) and/or cantilevered arm(s). In some examples, housing vibration damper(s) 218 serve to reduce points of contact between motor assembly housing 206 and rail 102 and, thus, reduce locations for vibrational force transfers. Housing vibration damper(s) 218 can be coupled to motor assembly housing 206 via one or more mechanical or chemical fasteners. Also, housing vibration damper(s) 218 can be located in other locations relative to motor assembly housing 206 than illustrated in FIG. 2.

Figure 3:
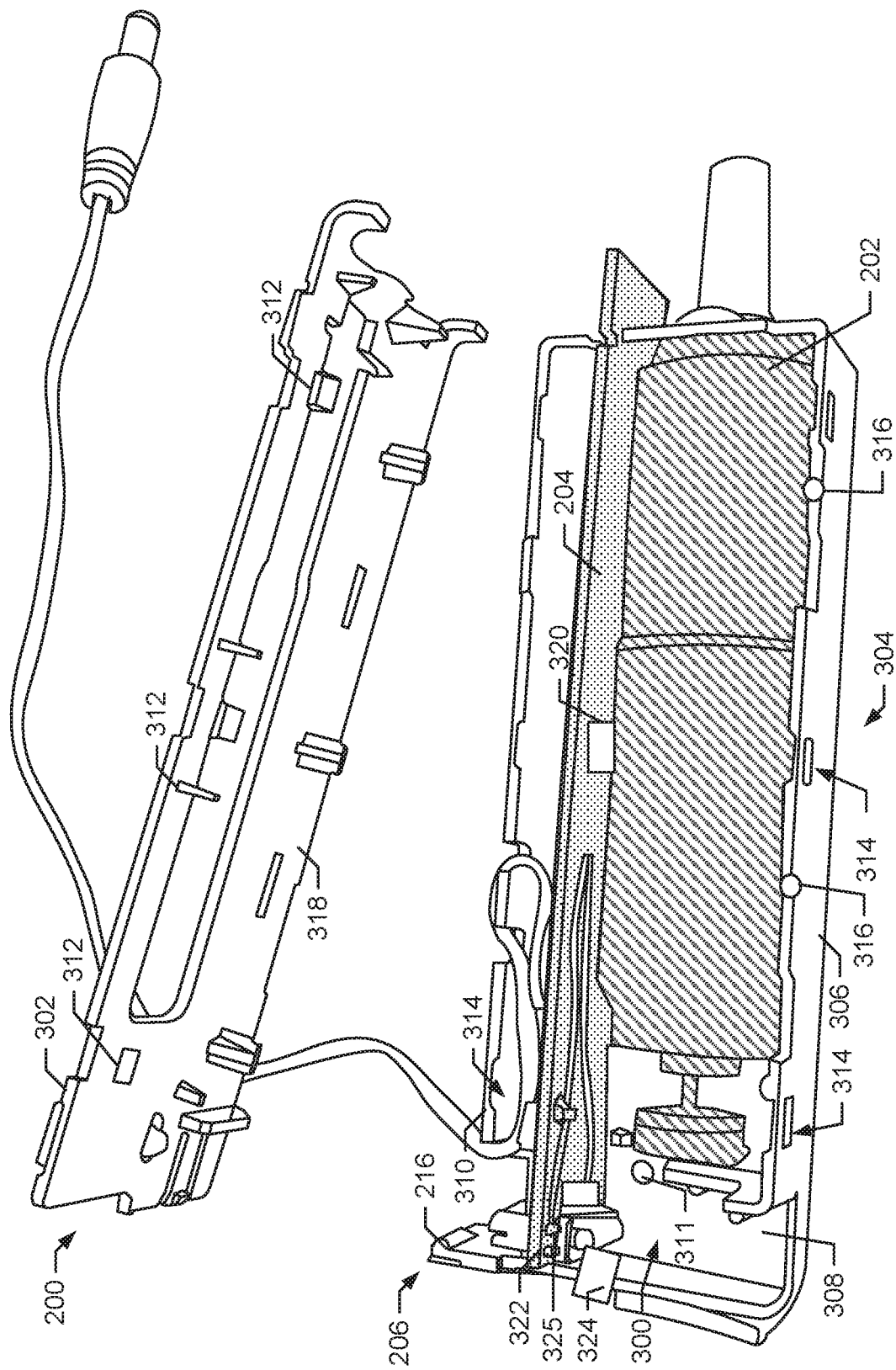
FIG. 3 is a right, front perspective view of the example of the motor assembly of FIG. 2 partially disassembled to show an example of a motor and an example of a printed circuit board of the motor assembly.

FIG. 3 is a right, front perspective view of example motor assembly 200 of FIG. 2 including motor 202 and printed circuit board 204 disposed in interior 300 of motor assembly housing 206. In the example of FIG. 3, motor assembly housing 206 includes first portion 302 removably coupled to second portion 304. For illustrative purposes, first portion 302 is shown as uncoupled from second portion 304 in FIG. 3. First portion 302 can be a plate or cover. In some examples, first portion 302 is a bottom or ground-facing portion of motor assembly housing 206 when rail assembly 100 is installed over an architectural opening. In other examples, first portion 302 is a top- or side-facing portion of motor assembly housing 206 when rail assembly 100 is installed over an architectural covering. In the example of FIG. 3, second portion 304 of the motor assembly housing 206 includes first face 306, second face 308, and third face 310. Faces 306, 308, 310 of second portion 304 define interior 300 that receives motor 202 and printed circuit board 204. As discussed below (FIG. 8), in some examples, second face 308 includes a pin receiver 311, or an aperture, that receives a pin to couple shading material to motor assembly 200.

In accordance with one aspect of this disclosure, a shape of the motor assembly housing can be selectively customized based on shape of the rail. Such disclosed examples enable the motor assembly to be used in differently shaped or sized rails without compromising a secure slide fit between the motor assembly housing and the rail. In some disclosed examples, a portion of the motor assembly housing can be removed and replaced or, in some examples, added to the motor assembly housing to adjust a shape of the motor assembly housing. In addition to enabling a shape of the motor assembly housing to be adjusted, the ability to selectively remove and recouple a portion of the motor assembly housing provides for access to the components of the motor assembly, such as a motor, printed circuit board, light(s) (e.g., light emitting diode(s)), etc. for maintenance purposes.

For example, as illustrated in FIG. 3, first portion 302 of motor assembly housing 206 can be removably coupled to second portion 304 via a snap fit, a hinged fit, a press fit, etc. For example, first portion 302 of FIG. 3 includes hooks 312 that are removably received in respective openings 314 defined in first face 306 and third face 310 of second portion 304 of motor assembly housing 206. A user can remove first portion 302 from second portion 304 by pressing on at least a portion of hooks 312 to disengage hooks 312 from openings 314 to enable hooks 312 to be removed from openings 314 and, thus, first portion 302 to be removed from second portion 304.

The removable coupling between first portion 302 and second portion 304 of motor assembly housing 206 enables a shape of motor assembly housing 206 to be selectively modified based on, for example, a shape of a rail (e.g., rail 102 of FIGS. 1 and 2) in which motor assembly 200 is to be disposed. For example, although FIGS. 1-2 illustrate rail 102 having a substantially rectangular shape, in other examples, motor assembly 200 may be disposed in a rail having a rounded or curved portion. For example, a face of the rail may be curved relative to a remainder of the rail. In such examples, substantially flat first portion 302 of FIG. 3 can be removed from second portion 304 and replaced with a substantially curved portion (e.g., a substantially curved plate) to complement the substantially curved portion of the rail. Thus, a shape of example motor assembly housing 206 can be selectively customized via removable first portion 302 to enable motor assembly 200 to be used with rails having different shapes.

Further, in the example of FIG. 3, the shape of motor assembly housing 206 is not limited with respect to a shape of motor 202. Rather, motor assembly housing 206 can have a different shape than motor 202. For example, motor assembly housing 206 of FIG. 3 has a substantially rectangular shape and motor 202 has a substantially cylindrical shape. Thus, motor assembly housing 206 enables motor 202 to be securely coupled to the rail (e.g., rail 102 of FIGS. 1 and 2) based on the complementary shape of motor assembly housing 206 relative to the rail. As disclosed herein, the complementary shapes of motor assembly housing 206 and rail 102 provide for a secure slide fit as compared to if, for example, a shape of motor assembly housing 206 was based on a shape of motor 202 (e.g., cylindrical), which may differ from a shape of rail 102 (e.g., rectangular). The secure slide fit between motor assembly housing 206 and rail 102 prevents or substantially reduces opportunities for rotation and/or vibration of motor assembly housing 206 during operation of motor 202.

During operation of motor 202, motor 202 generally generates vibrations. Vibrational forces generated by motor 202 can be transferred to components in contact with motor 202, such as motor assembly housing 206. For example, if motor 202 is in contact with faces 306, 308, 310 of motor assembly housing 206, vibrations from motor 202 may cause motor assembly housing 206 to vibrate. When motor assembly housing 206 is disposed in rail 102, the vibrational forces from motor 202 and/or motor assembly housing 206 may cause rail 102 to vibrate. Such vibrations can generate noise, can increase wear on the rail, etc.

In accordance with one aspect of the disclosure, motor 202 is coupled to motor assembly housing 206 to reduce and/or isolate vibrations of motor 202 from motor assembly housing 206. In some examples, motor 202 is coupled to motor assembly housing 206 via one or more mechanical fasteners (e.g., screws, a collar). In some such examples, motor 202 is coupled to one of first, second, or third faces 306, 308, 310 of motor assembly housing 206 but not to the other of faces 306, 308, 310. Therefore, contact between motor 202 and motor assembly housing 206 is minimized and, thus, points of transfer of vibrational forces between motor 202 and motor assembly housing 206 are minimized as compared to if motor 202 engaged each of the faces 306, 308, 310. Therefore, translations of vibrations from motor 202 to motor assembly housing 206 are reduced as compared to if motor 202 was mechanically coupled to all of faces 306, 308, 310 of second portion 304 of motor assembly housing 206. In some examples, grommet(s) are disposed between the mechanical fasteners and face(s) 306, 308, 310 to which motor 202 is coupled to reduce or isolate vibrations of motor 202 from motor assembly housing 206 and, thus, the rail (e.g., the rail 102) to which motor assembly 200 is coupled. In some examples, a location of motor 202 and the mechanical fasteners relative to faces 306, 308, 310 are selected based on noise reduction relative to other locations.

In some examples, example motor assembly 200 includes one or more motor vibration dampers 316 disposed between motor 202 and one or more of first, second, or third faces 306, 308, 310 of second portion 304 and/or face 318 of first portion 302 of motor assembly housing 206. Motor vibration damper(s) 316 can include, for example, rubber isolators or other materials capable of damping vibrations during operation of motor 202 (e.g., foam). Motor vibration damper(s) 316 are disposed in motor assembly housing 206 to reduce vibrational forces. In some examples, motor vibration damper(s) 316 are disposed between one or more of face(s) 306, 308, 310, 318 of motor assembly housing 206 and motor 202 (e.g., inserted into motor assembly housing 206 in a spaced defined between one of the faces and motor 202). In some examples, motor vibration damper(s) 316 are coupled to one or more of face(s) 306, 308, 310, 318 of motor assembly housing 206 via mechanical and/or chemical fasteners to reduce movement of motor vibration damper(s) 316. In other examples, motor vibration damper(s) 316 are coupled to one or more portions of motor 202 to position the motor vibration damper(s) 316 in direct or substantially direct contact with the source of the vibrations and, thus, to dampen the vibrations at the source and reduce transfer of the vibrational forces. Motor assembly 200 can include a different number of motor vibration dampers 316 and/or differently sized and/or differently shaped motor vibration dampers 316 than illustrated in FIG. 3. Also, a location of motor vibration dampers 316 can differ from that shown in FIG. 3.

In accordance with one aspect of this disclosure, the complementary shapes and the removably secure coupling between the motor assembly housing and the rail prevents and/or reduces rotation and/or vibration of the motor assembly housing during operation of the motor. As disclosed herein, the coupling of the motor assembly to the first end cap (and, in some examples, to the second end cap) and the coupling of the end caps to the rail further secures the motor assembly relative to the rail to reduce torsional movement of the motor assembly. The reduction of rotation and/or vibration of the motor assembly housing enables a single printed circuit board to be used to control one or more features of the architectural covering, such as the motor, and to communicate with, for example, an antenna. A single printed circuit board can be used without a risk of the printed circuit board being subject to excessive vibrations from the motor that can damage the printed circuit board and/or the electrical components coupled thereto. Thus, in one aspect of the disclosure, a reduced number of printed circuit boards may be used as compared to examples in which multiple printed circuit boards are used for the purpose of separating certain hardware components from the motor to protect the hardware components from motor vibrations.

For example, referring to the example illustrated in FIG. 3, motor controller 320 and antenna switch 322 are coupled to printed circuit board 204. In the example of FIG. 3, switch 322 is coupled to printed circuit board 204 proximate to second end 216 of motor assembly housing 206, or the end of motor assembly housing 206 that couples to first end cap 104. Motor assembly 200 includes antenna 324 communicatively coupled to switch 322. In some examples, light source 325, which may be a light emitting diode, is coupled to printed circuit board 204. In some such examples, light source 325 is operatively coupled to switch 322. Light source 325 provides information to a user such as a status of one or more operations of motor 202 in response to receiving a user command via a remote control in communication with antenna 324. In some examples, switch 322 controls emission of light from light source 325. Thus, a separate printed circuit board is not required to be coupled to or disposed proximate to motor assembly 200 containing hardware, circuity, etc. for communication between antenna 324 and switch 322 to enable control (e.g., remote control) of motor 202 because motor controller 320 and switch 322 are both coupled to the printed circuit board 204. Further, the reduction of motor vibrations, as discussed above, enables switch 322 and light source 325 to be coupled to printed circuit board 204 without a risk that a location of switch 322 and/or light source 325 will move relative to second end 216 of motor assembly housing 206 to torsional movement of printed circuit board 204. As discussed below, in some examples, first end cap 104 includes one or more features (e.g., switch driver 508 of FIG. 5) to engage switch 322 and/or channel light from light source 325 for exposure to a user. Thus, reducing movement of switch 322 and/or light source 325 relative to printed circuit board 204 maintains alignment of switch 322 and light source 325 with first end cap 104.

In accordance with one aspect of this disclosure, the end cap is coupled to the motor assembly housing such that the end cap can move with at least one degree of freedom of motion and, in some examples, at least two degrees of freedom of motion or at least three degrees of freedom of motion relative to the motor assembly housing before the end cap is coupled to the rail. For example, the end cap can toggle or pivot relative to the motor assembly housing by moving relative to one or more axes extending through the motor assembly housing, such as movement about longitudinal and/or lateral axes of the motor assembly housing (e.g., a roll axis, a pitch axis). In one aspect of the disclosure, the degrees of freedom of motion of the end cap relative to the motor assembly housing during coupling of the end cap to the motor assembly housing provide for ease of assembly when aligning the end cap with the rail. For example, the ability to toggle the end cap relative to the motor assembly housing provides for ease of assembly when a user aligns edges of the protrusion of the end cap with the tracks formed in the rail as compared to if the end cap was rigidly coupled to the motor assembly housing by accommodating different manufacturing tolerances with respect to a size of the tracks, a height of the edges of the protrusion of the end cap, a width of the protrusion of the end cap, etc.

Figure 4:
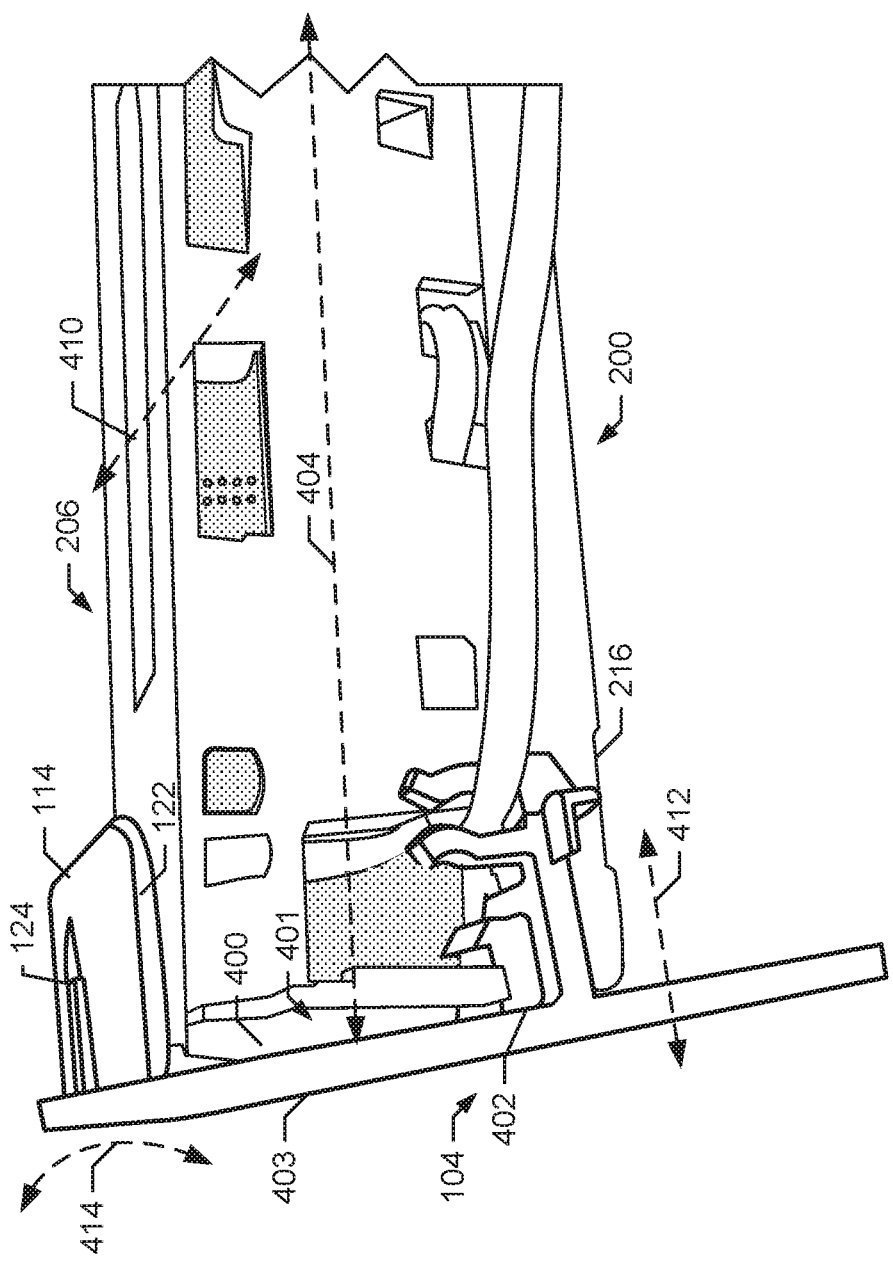
FIG. 4 is a side, rear perspective view of the example of the motor assembly of FIGS. 2 and 3 including an end cap coupled thereto

FIG. 4 is a side, rear perspective view of motor assembly housing 206 of motor assembly 200 including first end cap 104 coupled thereto. First end cap 104 can be coupled to motor assembly housing 206 via one or more means for coupling, such as protrusions 400 formed on first surface 402 of first end cap 104, or a surface opposite a room-facing or second surface 403 of end cap 104 when rail assembly 100 is installed over an architectural opening. Protrusion(s) 400 can include tabs, hooks, wings, etc. Protrusion(s) 400 engage one or more corresponding receivers 401 formed at second end 216 of motor assembly housing 206. Receiver(s) 401 can include apertures, connectors, etc. In the example of FIG. 4, when first end cap 104 is coupled to second end 216 of motor assembly housing 206, protrusion(s) 400 substantially secure first end cap 104 to motor assembly housing 206 relative to longitudinal axis 404 extending through motor assembly housing 206. As discussed above, the coupling of motor assembly 200 to first end cap 104 prevents or reduces axial movement of motor assembly 200 relative to first end cap 104 when first end cap 104 is coupled to rail 102 (e.g., as shown in FIG. 1). Put another way, the coupling of motor assembly 200 to first end cap 104 defines a location of motor assembly 200 relative to rail 102 when motor assembly 200 is disposed in rail 102 such that motor assembly 200 does not slide or rotate relative to rail 102 due to the coupling of first end cap 104 to rail 102.

As illustrated in FIG. 4, in some examples, first end cap 104 is coupled to motor assembly housing 206 prior to coupling of first end cap 104 to rail 102. In such examples, the coupling of first end cap 104 to second end 216 of motor assembly housing 206 provides for at least one degree of freedom of motion by first end cap 104 relative to motor assembly housing 206 before the first end cap 104 is coupled to the rail 102 and, in some examples, at least two degrees of freedom of motion or at least three degrees of freedom of motion by first end cap 104. For example, first end cap 104 can move relative to a lateral or pitch axis 410 extending through motor assembly housing 206. In some examples, at least a portion of first end cap 104 can move axially along the longitudinal axis 404 extending through motor assembly housing 206 while remaining coupled to motor assembly housing 206, as represented by arrow 412 of FIG. 4. In some examples, first end cap 104 can rotate relative to longitudinal axis 404 extending through motor assembly housing 206, as represented by arrow 414 of FIG. 4. Put another way, the coupling of protrusion(s) 400 of first end cap 104 to receiver(s) 401 of motor assembly housing 206 allows first end cap 104 to pivot or toggle relative to motor assembly housing 206 while maintaining the coupling of the first end cap 104 to the motor assembly housing 206. Thus, at least a portion of first end cap 104 is loosely coupled to motor assembly housing 206 prior to being coupled to first end cap 104 as compared to the substantially rigid coupling of first end cap 104 to rail 102 as disclosed above in connection with FIG. 1. When first end cap 104 is coupled to rail 102 as shown in FIG. 1, rail 102 restricts the degree(s) of freedom of motion of first end cap 104 and, thus, prevents movement of first end cap 104. As a result, in the example of FIGS. 1-4, rail 102 constrains or stabilizes movement of first end cap 104 to secure first end cap 104 and, thus, motor assembly 200 relative to rail 102 due to the coupling of motor assembly 200 to first end cap 104.

The relatively loose coupling of first end cap 104 to motor assembly housing 206 facilitates ease of assembly when coupling first end cap 104 to rail 102 after the motor assembly 200 has been inserted into the rail 102. For example, the ability to move first end cap 104 relative to motor assembly housing 206 provides for ease of assembly when a user aligns edges 122, 124 of first protrusion 114 of first end cap 104 with tracks 116, 120 of rail 102 and inserts edges 122, 124 into tracks 116, 120. The freedom of movement of first end cap 104 relative to motor assembly housing 206 facilitates insertion of edges 122, 124 of first protrusion 114 into tracks 116, 120 in view of different manufacturing tolerances with respect to a size and/or shape of the tracks 116, 120 and/or first protrusion 114 of first end cap 104. For example, a user can pivot first end cap 104 while inserting edges 122, 124 of first protrusion 114 into tracks 116, 120 of rail 102 for ease of insertion as compared to if first end cap 104 was rigidly coupled to motor assembly housing 206.

In accordance with one aspect of this disclosure, the end cap includes means for receiving at least a portion of the printed circuit board of the motor assembly to reduce movement of the printed circuit board during operation of the motor. In some disclosed examples, the end cap includes a switch driver (e.g., a button) to engage a switch on the printed circuit board. The switch driver can include a button that can be accessed by a user to manually control (directly by hand), for example, the motor. In one aspect of the disclosure, the switch driver serves a light pipe to direct light from the light source on the printed circuit board for exposure to the user when the end cap is coupled to the rail. In one aspect of the disclosure, the end cap helps to maintain alignment between the switch driver and the switch and/or the light source by restricting movement of the printed circuit board.

Figure 5:
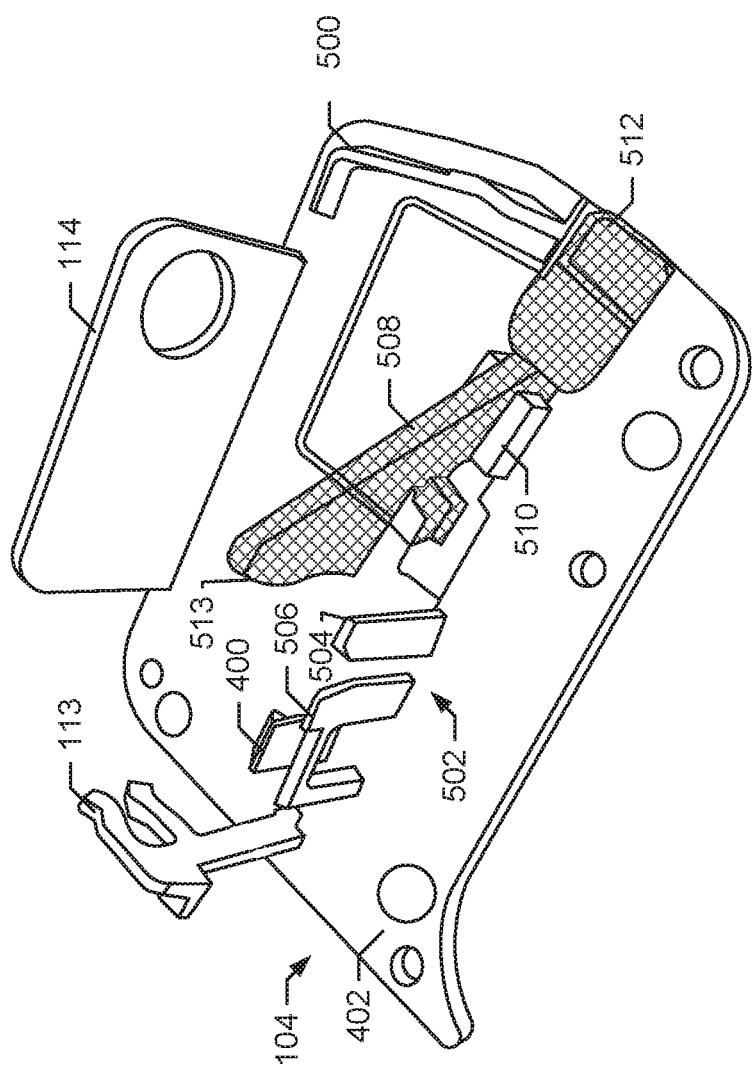
FIG. 5 is a top, perspective view of the example end cap of FIG. 4 uncoupled from the motor assembly of FIGS. 2-4.

FIG. 5 is a top perspective view of first end cap 104 uncoupled from motor assembly 200 of FIGS. 2-4. As illustrated in FIG. 5, first end cap 104 includes protrusions 400 to engage motor assembly housing 206 to couple first end cap 104 to motor assembly 200. First end cap 104 also includes wing 500 coupled to first surface 402 of first end cap 104 to engage a portion of interior 210 of rail 102, such as a corner, when first protrusion 114 engages tracks 116, 120 of rail 102 (e.g., as shown in FIG. 1). Wing 500 provides for further securing of first end cap 104 to rail 102 via, for example, an interference or press fit. First end cap 104 can include other wings and/or wings having different shapes and/or sizes than illustrated in FIG. 5.

Figure 6:
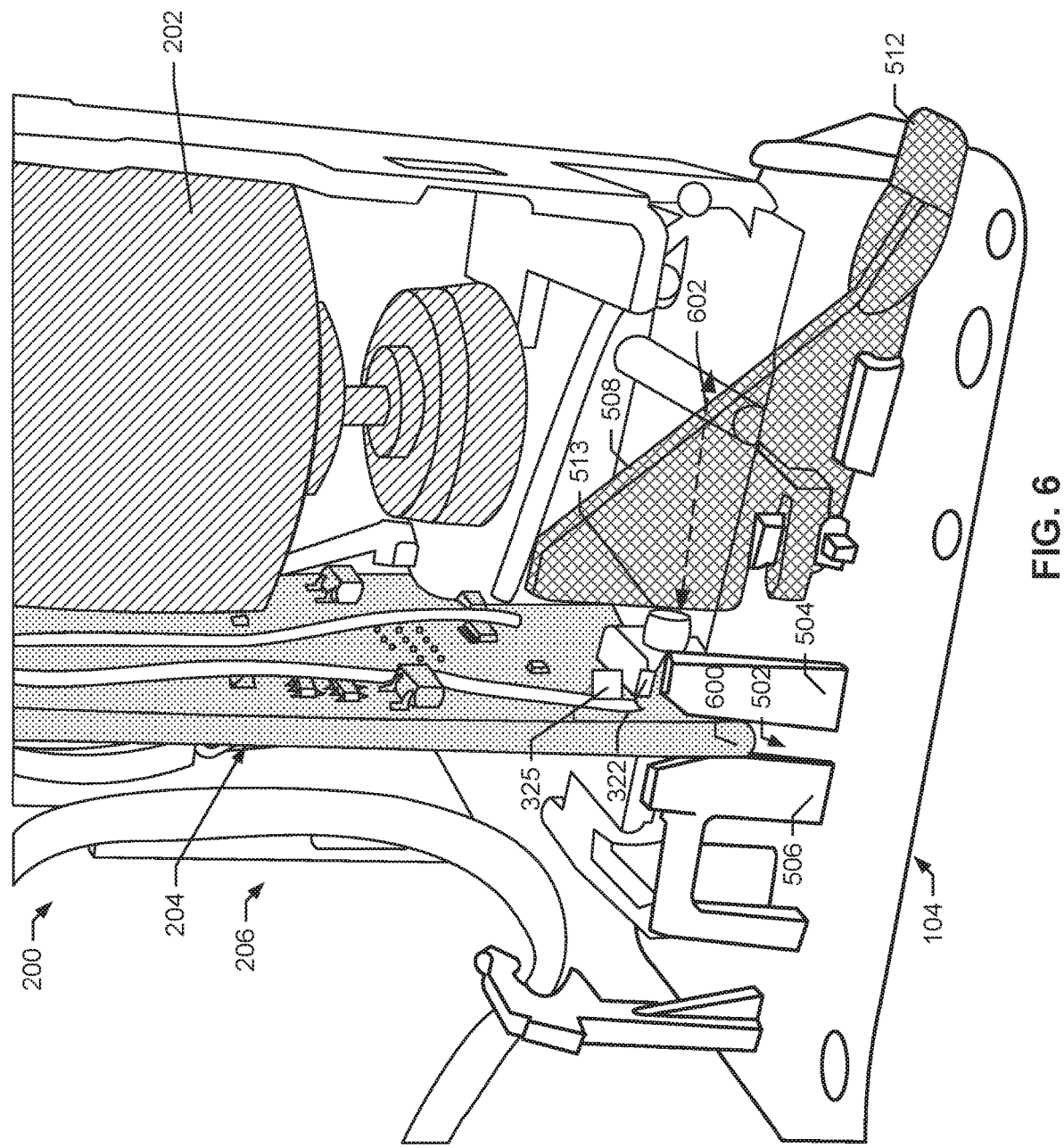
FIG. 6 is a side, perspective view of the example motor assembly of FIG. 4 including the end cap of FIGS. 4 and 5 coupled to the motor assembly of FIGS. 2-4.

First end cap 104 of FIG. 5 includes printed circuit board holder 502. In accordance with one aspect of the disclosure, printed circuit board holder 502 receives at least a portion of printed circuit board 204 when first end cap 104 is coupled to motor assembly housing 206. Printed circuit board holder 502 prevents or substantially reduces movement of printed circuit board 204 (e.g., side-to-side movement) due to, for example, vibrations of motor 202 by holding the at least the portion of the printed circuit board and, thus, restraining movement of printed circuit board 204 relative to first end cap 104. For example, printed circuit board holder 502 can include first tab 504 and second tab 506, where second tab 506 is spaced apart from first tab 504. Thus, in some examples, printed circuit board holder 502 has a substantially fork shape. When first end cap 104 is coupled to motor assembly 200, at least a portion of printed circuit board 204 of motor assembly 200 is disposed in printed circuit board holder 502 between first tab 504 and second tab 506 (as shown in FIG. 6). Printed circuit board holder 502 can have a different shape and/or size than illustrated in FIG. 5. Any of protrusion(s) 114, 400, wing(s) 500, and/or printed circuit board holder 502 of FIG. 5 can be integrally formed with first surface 402 of first end cap 104 (e.g., via a mold) or formed separately from first end cap 104 and coupled to first surface 402 of first end cap 104 via one or more mechanical and/or chemical fasteners.

First end cap 104 of FIG. 5 includes switch driver 508 and switch driver holder 510. Switch driver 508 of FIG. 5 is moveably coupled to switch driver holder 510. As disclosed herein, when first end cap 104 is coupled to motor assembly 200, switch driver 508 is substantially aligned with switch 322 and light source 325 of printed circuit board 204 of FIG. 2 such that at least a portion of switch driver 508 can selectively engage switch 322 via movement of switch driver 508.

Figure 7:
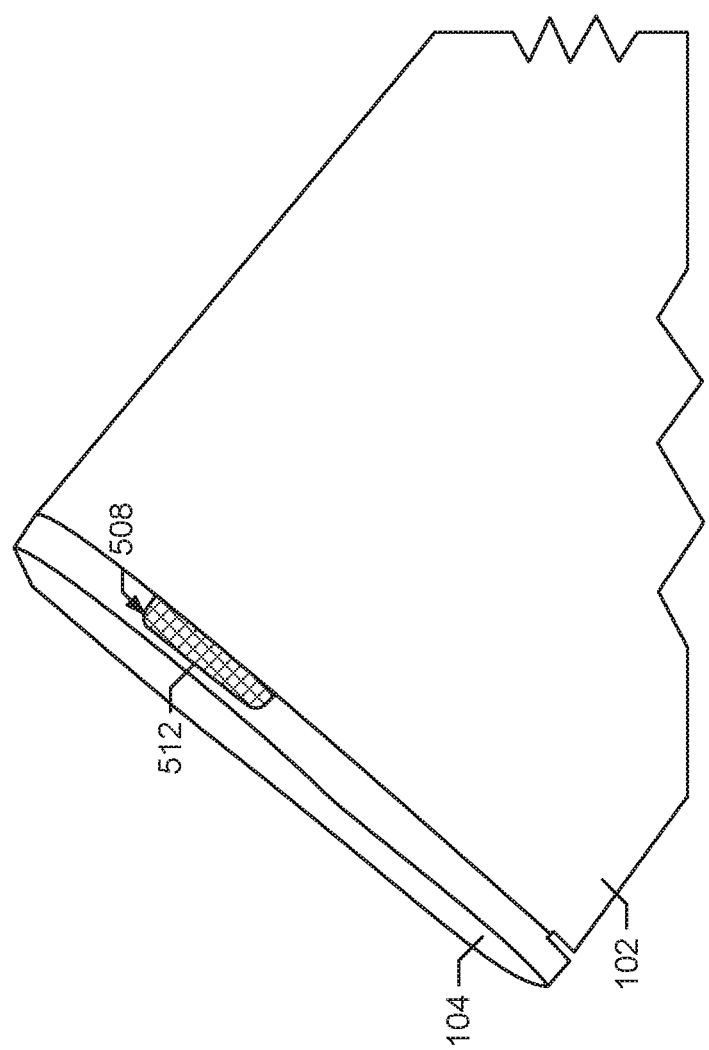
FIG. 7 is a side, perspective view of the example of the rail of FIG. 1 including the end cap of FIGS. 4 and 5 coupled thereto.

In some examples, switch driver 508 serves as a button to be activated by a user. For example, access portion 512 of switch driver 508 can be accessed by the user when first end cap 104 is coupled to rail 102 (as shown in FIG. 7). As disclosed herein, when access portion 512 of switch driver 508 is depressed by the user, engagement portion 513 of switch driver 508 depresses switch 322 of printed circuit board 204. Also, in the example of FIG. 5, at least a portion of switch driver 508 is made of a clear or substantially transparent material, such as a plastic. In the example of FIG. 5, switch driver 508 serves as a light pipe that directs light from light source 325 on printed circuit board 204 for exposure to the user via access portion 512 of switch driver 508.

In accordance with one aspect of the disclosure, the switch driver is coupled to the end cap to efficiently engage the switch on the printed circuit board when the printed circuit board is orientated parallel to the motor as shown in, for example FIG. 3, and, thus, perpendicular to the end cap. For example, when the end cap is coupled to the motor assembly housing, the switch driver is perpendicular to the switch on the printed circuit board. The perpendicular alignment between the switch driver and the switch reduces a length of a moment arm for the switch driver to engage the switch. Also, in accordance with another aspect of the disclosure, the switch driver includes a substantially wide switch engagement area that enables the switch driver to engage the switch even if the switch driver and switch become misaligned over time.

FIG. 6 is a side, perspective view of motor assembly 200 including first end cap 104 coupled to motor assembly 200. In FIG. 6, the first portion 302 of the motor assembly housing 206 has been removed to show the printed circuit board 204 and the motor assembly 200. As shown in FIG. 6, at least a portion 600 of printed circuit board 204 is disposed in printed circuit board holder 502 of first end cap 104. Also, switch driver 508 of the first end cap 104 is substantially aligned with switch 322 of printed circuit board 204 such that engagement portion 513 of switch driver 508 engages switch 322 when a user presses access portion 512 of switch driver 508. For example, printed circuit board 204 is substantially perpendicular to first end cap 104. Also, the movement of switch driver 508 is substantially perpendicular to switch 322 when a user depresses switch driver 508 via access portion 512, as represented by arrow 602 of FIG. 6. The alignment between switch driver 508 and switch 322 can differ from the example of FIG. 6. As illustrated in FIG. 6, switch driver 508 includes switch engagement surface 604 having a width and/or length that enables switch driver 508 to depress switch 322 when switch 322 is located in different positions relative to switch driver 508 due to, for example, misalignment of switch 322 relative to switch driver 508 over time. As another example, switch engagement surface 604 of switch driver 508 enables first end cap 104 to be used with motor assemblies including printed circuit boards in which switch 322 is located in a different position than illustrated in FIG. 6 due to variations in components of the printed circuit board.

Printed circuit board holder 502 receives at least a portion of printed circuit board 204 and, thus, prevents or substantially reduces movement of printed circuit board 204 relative to first end cap 104. Printed circuit board holder 502 helps to maintain alignment of switch driver 508 with switch 322 and light source 325 of printed circuit board 204. The coupling between printed circuit board 204 and printed circuit board holder 502 prevents changes in alignment between printed circuit board 204 and switch driver 508 during operation of motor 202 by preventing or reducing movement of printed circuit board 204 such as shaking or vibrating due to the vibrations of motor 202. Thus, first end cap 104 serves to orient or locate one or more portions of printed circuit board 204 to maintain a position of motor assembly 200 and to reduce the effects of vibrations of motor 202 that may lead to, for example, misalignment between switch driver 508 and switch 322 over time.

FIG. 7 is a side, perspective view of rail 102 including first end cap 104 coupled thereto. As illustrated in FIG. 7, access portion 512 of switch driver 508 of first end cap 104 is exposed when first end cap 104 is coupled to rail 102. Thus, light from light source 325 is emitted via access portion 512, for example, to inform a user as to the status of the operation of motor 202. In some examples, the exposure of access portion 512 also enables the user to press on access portion 512 to control the motor 202 via switch driver 508 and switch 322.

In accordance with another aspect of the disclosure, the motor assembly housing includes one or more pin slots to couple shading material to the motor assembly without compromising the coupling between the end cap, the motor assembly housing, and/or the rail. For example, the shading material includes a hole having a pin disposed therein. The pin is received in the pin slot of the motor assembly housing. In accordance with the present disclosure, the pin slot of the motor assembly is sized so as to accommodate different tolerances with respect to the location of the hole of the shading material, and thus, the location of the pin, relative to the pin slot of the motor assembly housing. The tolerance provided by the pin slot with respect to location of the shading material pin substantially prevents the shading material from pulling on the motor assembly and, thus, pulling the motor assembly away from the end cap during operation of the motor. In maintaining the positioning of the motor assembly relative to the end cap, alignment and/or operative couplings between one or more components of the rail, such as the antenna and the printed circuit board, are not disrupted.

Figure 8:
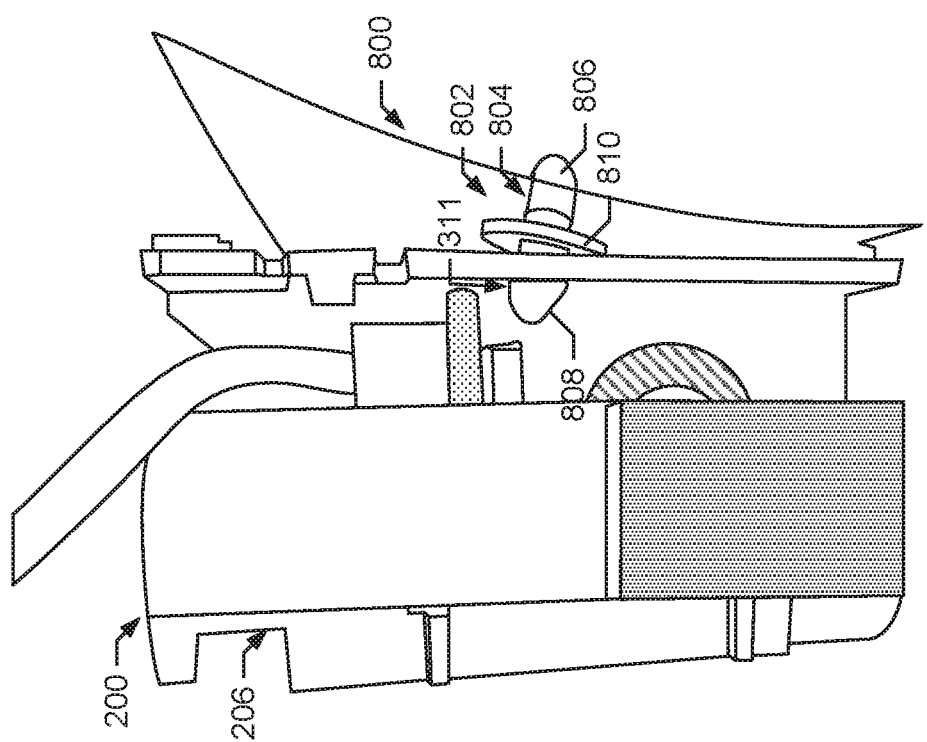
FIG. 8 is a side, perspective view of the example motor assembly of FIG. 4 including shading material coupled thereto.

FIG. 8 is a side, perspective view of motor assembly housing 206 coupled to shading material 800 via pin 802. As illustrated in FIG. 8, shading material 800 includes pin hole 804 to receive a first pin head 806 of pin 802. Motor assembly housing 206 includes pin receiver 311. Pin receiver 311 receives a second pin head 808 of pin 802. A size of pin receiver 311 enables pin 802 to slide within pin receiver 311 to provide for tolerance with respect to a location of pin hole 804 of shading material 800 relative to pin receiver 311 of motor assembly housing 206. Further, the ability of pin 802 to move relative to pin receiver 311 prevents shading material 800 from pulling on motor assembly housing 206 during, for example, extension of shading material 800 and, thus, prevents motor assembly 200 from being pulled by shading material 800 away from end cap 104. Therefore, the alignment between end cap 104 and motor assembly 200 and/or components thereof (e.g., antenna 324 and switch 322, switch driver 508 and switch 322) is not disrupted. As illustrated in FIG. 8, pin 802 can include one or more collars 810 to reduce interference (e.g., binding) between shading material 800 and motor assembly 200.

Figure 9:
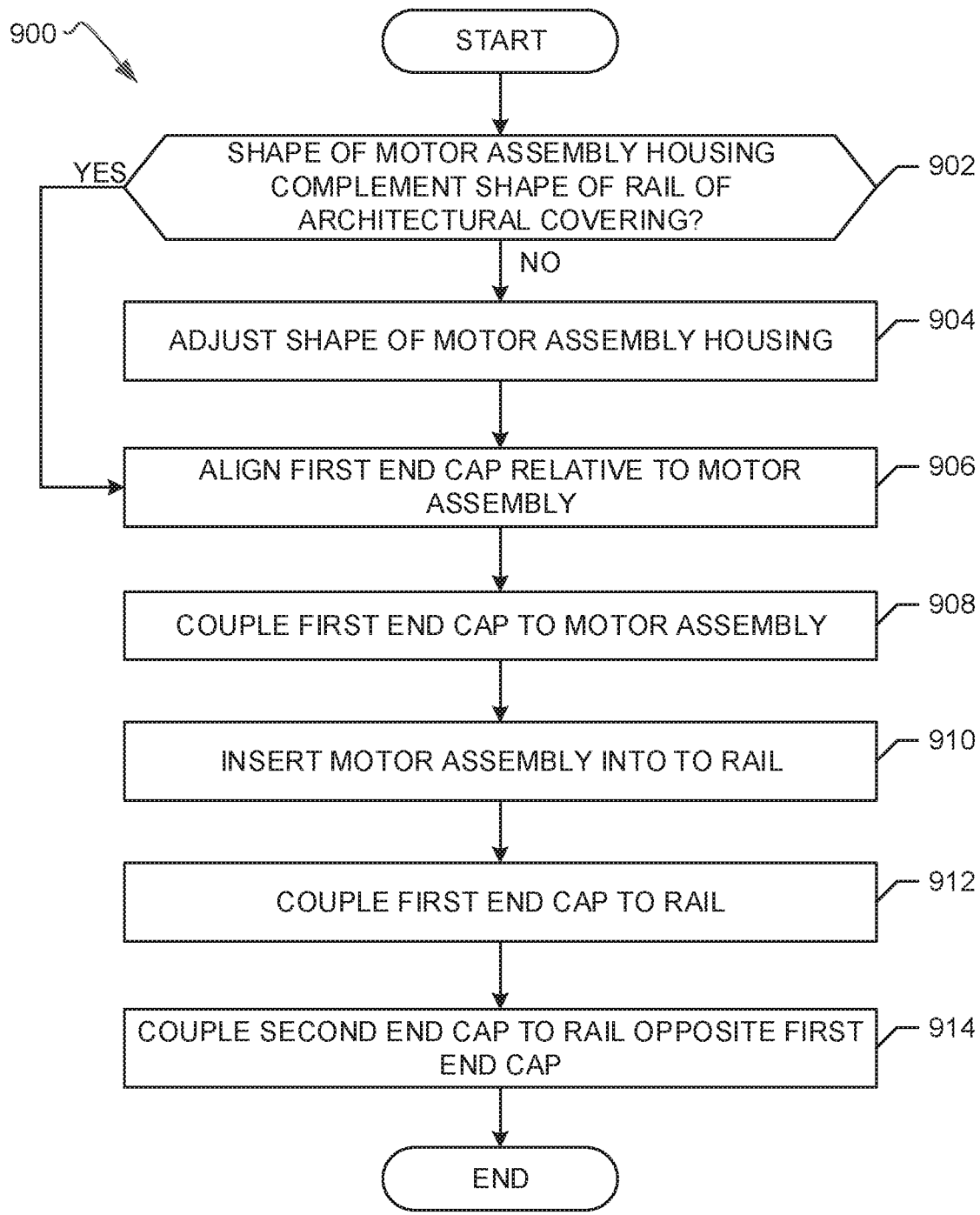
FIG. 9 is a flowchart representative of an example of a process for coupling a motor assembly to a rail of an architectural covering.

FIG. 9 is a flowchart illustrating an example of method 900 for coupling a motor assembly to a rail of an architectural covering. Although method 900 is disclosed with reference to the flowchart illustrated in FIG. 9, many other methods of coupling a motor assembly to a rail may alternatively be used. For example, the order of execution of the block(s) may be changed, and/or some of the blocks described may be changed, eliminated, or combined.

Method 900 includes a determination of whether a shape of a motor assembly housing complements a shape of a rail of an architectural covering (block 902). In the example method, the motor assembly housing is disposed in the rail. Thus, to facilitate ease of insertion of the motor assembly housing into the rail and to provide for a substantially secure fit between the motor assembly housing and the rail, the motor assembly housing and the rail can have substantially complementary shapes. For example, motor assembly housing 206 of FIG. 2 has a substantially rectangular exterior shape that complements a substantially rectangular interior shape of rail 102.

If a shape of the motor assembly housing does not complement a shape of the rail, method 900 includes adjusting a shape of the motor assembly housing (block 904). The ability to adjust the shape of the motor assembly housing enables the motor assembly housing to be used with differently shaped rails and, thus, provides for versatile use of the motor assembly housing. For example, a user can remove first portion 302 from second portion 304 of motor assembly housing 206 of FIG. 2 and replace first portion 302 with a plate or cover having a different shape that complements a shape of rail 102.

Method 900 includes aligning a first end cap relative to a motor assembly (block 906). In the example method, the end cap is coupled to the motor assembly and, thus, serves to locate the motor assembly relative to the rail when the end cap is coupled to the rail. Thus, the motor assembly is not loosely disposed in the rail, but instead is coupled to the end cap, which is coupled to the rail. As discussed herein, the coupling of the motor assembly to the end cap secures the motor assembly relative to the rail to reduce torsional movement of the motor assembly. Also, the reduction of rotation and/or vibration of the motor assembly enables a single printed circuit board to be used in the motor assembly, as the reduction in vibrations reduces risk of movement of one or more components of the printed circuit board (e.g., the switch 322) relative to the printed circuit board over time. In some examples, the end cap holds at least a portion of the printed circuit board to restrain movement of the printed circuit board and maintain alignment of the printed circuit board with the end cap.

For example, a user can align first end cap 104 of FIGS. 1 and 4-7 relative to motor assembly 200 of FIG. 2 such that printed circuit board holder 502 is aligned with portion 600 of printed circuit board 204 and portion 600 can be received in printed circuit board holder 502. In the example of FIG. 8, the aligning of printed circuit board holder 502 relative to printed circuit board 204 facilitates alignment between switch driver 508 of first end cap 104 and switch 322 of printed circuit board 204.

Method 900 includes coupling the first end cap to the motor assembly (block 908). For example, first end cap 104 of FIGS. 1 and 4-7 includes one or more protrusions 400 to engage corresponding receiver(s) 401 of motor assembly housing 206 to couple first end cap 104 to motor assembly 200. In some examples, cable 112 of motor assembly 200 is coupled to (e.g., routed through) cable receiver 113 of first end cap 104.

Method 900 includes inserting the motor assembly into the rail (block 910). For example, a user can slide motor assembly 200 into rail 102 of FIG. 1. In some examples, the complementary shaped motor assembly housing 206 and rail 102 provides a substantially secure slide fit between rail 102 and motor assembly 200 that minimizes, for example, movement of motor assembly 200 relative to the rail 102.

Method 900 includes coupling the first end cap to the rail (block 912). In the example method, coupling the end cap to the rail locates the motor assembly, which is coupled to the end cap, relative to the rail. Thus, the motor assembly is not loosely disposed inside the rail, but instead, is positioned relative to the rail via the end cap. Also, the coupling of the end cap to the rail prevents rotational and/or axial motion of the end cap, which further restrains movement of the motor assembly during, for example, operation of the motor. Thus, the interfaces between the rail, the end cap, and the motor assembly provide for increased stability of the rail as compared to if the motor assembly was not coupled to the end cap.

For example, first end cap 104 of FIGS. 1 and 4-7 includes protrusion 114 that is received in tracks 116, 120 of rail 102 of FIG. 1. A user can push or slide protrusion 114 such that protrusion 114 engages the tracks 116, 120. In some examples, first end cap 104 includes wing(s) 500 that engage one or more portions (e.g., corners) of rail 102 when the user couples first end cap 104 to rail 102. In some examples, rail 102 prevents motion (e.g., rotational and/or axial motion) of first end cap 104, thereby locking first end cap 104 and, thus, motor assembly 200, to rail 102.

Method 900 includes coupling a second end cap to the rail opposite the first end cap (block 914). For example, a user can couple second end cap 108 of FIG. 1 to rail 102 via one or more protrusions and corresponding openings or receivers associated with second end cap 108 and rail 102. Thus, method 900 provides for coupling of a motor assembly to a rail of an architectural covering that removably secures the motor assembly to the rail via end cap(s) to reduce unintended effects of motor vibrations on the coupling.

From the foregoing, it will be appreciated that the above-disclosed apparatus and methods provide for secure coupling of a motor assembly to a rail of an architectural covering such that vibrational effects of a motor on one or more other components of the motor assembly and/or the rail are minimized. In disclosed examples, motor assemblies include a single printed circuit board including hardware for motor control, communication with an antenna, etc. In examples disclosed herein, the printed circuit board is protected from motor vibrations via the coupling of the motor assembly to an end cap, which includes a receiver to hold at least a portion of the printed circuit board, prevent rotational motion of the printed circuit board, and reduce misalignment between a switch on the printed circuit board and a switch driver (e.g., a button) on the end cap. Further, the coupling of the motor assembly to the end cap and the locking of the end cap to the rail prevents unrestrained movement of the motor assembly relative to the rail. Thus, examples disclosed herein provide for rail assemblies that promote integrity of the components disposed in the rail in view of motor vibrations.

Example rail assemblies for architectural coverings and related methods are disclosed herein. An example rail for an architectural covering disclosed herein includes a housing and a motor to be disposed in the housing. The example rail includes an end cap to be coupled to the housing. The example rail includes a track defined in an exterior face of the rail. A first portion of the end cap is to be received in the track. The end cap is capable of at least two degrees of freedom of motion relative to the housing prior to the first portion being received in the track. The track is to restrict the at least two degrees of freedom of motion of the end cap when said first portion of said end cap is received in said track.

In some examples, the rail further includes a printed circuit board disposed in the housing, the end cap to receive at least a portion the printed circuit board. In some such examples, the rail further includes a switch coupled to the printed circuit board and a driver coupled to the end cap, the driver disposed perpendicular relative to said switch, the driver to selectively engage the switch.

In some examples, the at least two degrees of freedom of motion includes rotational motion relative to a longitudinal axis of the housing. In some such examples, the at least two degrees of freedom of motion includes motion relative to a lateral axis of the housing.

In some examples, the track includes a first track and a second track, a first edge of the first portion of the end cap is to be received in the first track and a second edge of the first portion is to be received in the second track.

In some examples, the motor has a first shape and the housing has a second shape different from the first shape.

In some examples, the housing includes a first end and a second end opposite said first end, the end cap to be coupled to the first end of the housing, the second end including a protrusion to engage an interior of the rail.

An example architectural covering disclosed herein includes a rail, a housing to be disposed in the rail, and a motor to be disposed in the housing. The example end cap is to be coupled to the rail and to the housing. The end cap is capable of pivoting relative to the housing when the end cap is coupled to the housing prior to the end cap being coupled to the rail, the rail to restrict the pivoting of the end cap when the end cap is coupled to the rail.

In some examples, the architectural covering further includes a printed circuit board disposed in the housing and an antenna coupled to the housing, the printed circuit board to be operatively coupled to the motor and the antenna.

In some examples, when the end cap is coupled to the rail, the rail is to restrict one or more of axial movement of the end cap relative to the housing or rotational movement of the end cap relative to the housing.

In some examples, the end cap includes a protrusion, at least a portion of the protrusion to engage the rail.

In some examples, the housing includes a first portion removably coupled to a second portion. In some such examples, a shape of the first portion is based on a shape of the rail.

Another example rail for an architectural covering disclosed herein includes a first housing and a second housing including a motor. The second housing is to be disposed in the first housing. The rail includes an end cap to be coupled to the first housing and the second housing. The end cap is capable of at least two degrees of freedom of motion relative to the second housing prior to the end cap being coupled to the first housing. The first housing is to constrain the at least two degrees of freedom of motion of the end cap when the first portion of the end cap is coupled to the first housing and the second housing.

In some examples, the end cap includes a protrusion coupled to a surface of the end cap, the protrusion to engage a slot defined in an exterior face of the first housing. In some such examples, the protrusion is to slidably engage the slot.

In some examples, the housing includes a printed circuit board, the printed circuit board including a light source coupled thereto. In some such examples, a portion of the end cap is to direct light emitted by the light source, the light to be exposed via the portion of the end cap when the end cap is coupled to the rail. In some such examples, the end cap includes a switch driver and at least a portion of the end cap is to receive the printed circuit board to align the switch driver relative to the printed circuit board.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A rail for an architectural covering, said rail comprising:
    a rail housing having an interior shape;
    a motor assembly to be disposed in the rail housing, wherein the motor assembly comprises a motor housing that has an exterior shape complementing and engaging the interior shape of the rail housing;
    an end cap coupled to the rail housing and the motor housing such that the end cap is in direct contact with the motor housing, wherein the end cap comprises a first protrusion received in a track defined in an exterior face of the rail housing, and a second protrusion that is engaged with a receiver formed at an end of the motor housing; and
    wherein the end cap is capable of at least two degrees of freedom of motion relative to the rail housing prior to the first protrusion being received in the track, and
    wherein the track is to restrict the at least two degrees of freedom of motion of the end cap when the first protrusion of the end cap is received in the track.

2. The rail of claim 1, further including a printed circuit board disposed in the rail housing, the end cap to receive at least a portion of the printed circuit board.

3. The rail of claim 2, further including a switch coupled to the printed circuit board and a driver coupled to the end cap, the driver disposed perpendicular relative to the switch, the driver to selectively engage the switch.

4. The rail of claim 1, wherein the at least two degrees of freedom of motion includes rotational motion relative to a longitudinal axis of the rail housing.

5. The rail of claim 3, wherein the at least two degrees of freedom of motion includes motion relative to a lateral axis of the rail housing.

6. The rail of claim 1, wherein the track includes a first track and a second track, a first edge of the first protrusion of the end cap to be received in the first track and a second edge of the first protrusion to be received in the second track.

7. The rail of claim 1, wherein the rail housing includes a first end and a second end opposite the first end, the end cap to be coupled to the first end of the rail housing, the second end including the first protrusion to engage an interior of the rail.

8. The rail of claim 1, wherein the end cap comprises a wall and a set of protrusions including the second protrusion and disposed on an interior surface of the wall, wherein the set of protrusions defines a channel that ends at the interior surface of the wall, wherein the set of protrusions engages and is in contact, via the channel, with a printed circuit board of the motor assembly.

9. The rail of claim 1, wherein the track includes, along a longitudinal axis of the rail housing, a first track and a second track opposite of the first track, wherein the first protrusion extends along the longitudinal axis, and wherein a first edge of the first protrusion of the end cap is received in the first track and a second edge of the first protrusion to be received in the second track.

10. The rail of claim 1, wherein the exterior shape of the motor housing and the interior shape of the rail housing are substantially the same such that the motor assembly is disposed in the rail housing in a slip fit installation.

11. An architectural covering comprising:
    a rail having a rail housing, the rail housing having an interior shape;
    a motor assembly disposed in the rail housing, the motor assembly comprising a motor housing that has an exterior shape complementing and engaging the interior shape of the rail housing; and
    an end cap coupled to the rail housing and the motor housing such that the end cap is in direct contact with the motor housing, the end cap comprising a first protrusion that is received in the rail housing and a second protrusion that is in engaged with a receiver formed at an end of the motor housing, the end cap capable of pivoting relative to the rail housing when the end cap is coupled to the rail housing prior to the end cap being coupled to another portion of the rail, the other portion of the rail to restrict the pivoting of the end cap when the end cap is coupled to the rail.

12. The architectural covering of claim 11, further including a printed circuit board disposed in the motor housing and an antenna coupled to the rail housing, the printed circuit board to be operatively coupled to the motor in the motor housing and the antenna.

13. The architectural covering of claim 11, wherein when the end cap is coupled to the other portion of the rail, the rail to restrict one or more of axial movement of the end cap relative to the rail housing or rotational movement of the end cap relative to the rail housing.

14. The architectural covering of claim 11, wherein at least a portion of the first protrusion is configured to engage the other portion of the rail.

15. The architectural covering of claim 11, wherein at least a portion of the exterior shape of the motor housing matches a corresponding portion of the interior shape of the rail.

16. A rail for an architectural covering, said rail comprising:
    a first housing having an interior shape;
    a second housing including a motor, the second housing disposed in the first housing and having an exterior shape complementing and engaging the interior shape of the first housing; and
    an end cap coupled to the first housing and the second housing such that the end cap is in direct contact with the second housing,
    wherein the end cap comprises a first protrusion that is received in the rail housing and a second protrusion that is engaged with a receiver formed at an end of the motor housing, wherein the end cap is capable of at least two degrees of freedom of motion relative to the second housing prior to the end cap being coupled to the first housing, and wherein the first housing is to constrain the at least two degrees of freedom of motion of the end cap when the end cap is coupled to the first housing and the second housing.

17. The rail of claim 16, wherein the first protrusion is configured to engage a slot defined in an exterior face of the first housing.

18. The rail of claim 17, wherein the first protrusion is to slidably engage the slot.

19. The rail of claim 16, wherein the second housing includes a printed circuit board, the printed circuit board including a light source coupled thereto, wherein a portion of the end cap is to direct light emitted by the light source, the light to be exposed via the portion of the end cap when the end cap is coupled to the rail.

20. The rail of claim 19, wherein the end cap includes a switch driver and wherein at least a portion of the end cap is to receive the printed circuit board to align the switch driver relative to the printed circuit board.

* * * * *